United States Patent [19]

Anderson

[11] 3,842,250

[45] Oct. 15, 1974

[54] CIRCUIT FOR IMPLEMENTING ROUNDING IN ADD/SUBTRACT LOGIC NETWORKS

[75] Inventor: Bruce M. Anderson, New Brighton, Minn.

[73] Assignee: Sperry Rand Corporation, New York, N.Y.

[22] Filed: Aug. 29, 1973

[21] Appl. No.: 392,721

[52] U.S. Cl. .................... 235/175
[51] Int. Cl. .................... G06f 7/50
[58] Field of Search .................... 235/175

[56] References Cited

UNITED STATES PATENTS

| | | | |
|---|---|---|---|
| 3,509,330 | 4/1970 | Batte | 235/175 |
| 3,594,565 | 7/1971 | Ragen | 235/160 |
| 3,699,326 | 10/1972 | Kindell et al. | 235/175 |

*Primary Examiner*—Malcolm A. Morrison
*Assistant Examiner*—David H. Malzahn
*Attorney, Agent, or Firm*—Thomas J. Nikolai; Kenneth T. Grace; John P. Dority

[57] ABSTRACT

An add/subtract logic network for forming the sum or difference of two n-bit operands with round-off occurring simultaneously with the formation of the n-bit result.

8 Claims, 3 Drawing Figures

CIRCUIT FOR IMPLEMENTING ROUNDING IN ADD/SUBTRACT LOGIC NETWORKS

BACKGROUND OF THE INVENTION

In digital computing equipment where arithmetic operations are performed in registers of a predetermined bit capacity it oftentimes happens that the sum or difference of two operands can result in a value which exceeds the capacity of the result register. To obviate this problem, it has been found convenient to scale the operands by shifting to the right one bit position thereby, in effect, multiplying the operands by a scale factor of ½. The right shifting operation causes the least significant bit (LSB) of the operands to be lost and the resulting sum or difference is in error. Another approach which can be used is to form the sum or difference in an $n + 1$ bit adder and subsequently scale the result by a right shift operation. When a series of additions and/or subtractions are done in a sequence such as when it is desired to form the result of $A \pm B \pm C \pm D \ldots$, the approaches of scaling either the inputs to or the results of an adder network with truncation can lead to an unacceptable accumulated error build-up, unless steps are taken to " round-off" the results.

In all prior art systems of which I am aware, it has been the usual practice to first form the sum (or difference) of the operands in an $n + 1$ bit adder, allowing truncation to take place for the final results and then operate on the final result as a separate step to accomplish rounding. This necessarily adds to the time required to perform the operation.

In accordance with the teachings of the present invention, rounding is accomplished by logic which affects each individual adder or subtracter in the network rather than by an additional operation on the results of the add/subtract network. As such, each adder/subtracter in the network need only be as large in terms of bit capacity as the final result. For example, if the designed result register size for the add/subtract network is 16 bits, then no adder/subtracter utilized in the network need exceed 16 bits in size.

In accordance with the teachings of this invention, a digital logic network is provided for examining the least significant bits (LSB) of the scaled operands, the nature of the operation to be performed (addition or subtraction) and certain intermediate results of the add/subtract network and as a result of this examination, a determination is made whether to force a carry (a binary "1" signal) into the lowest order stage of the adders/subtracters utilized in the network in order to form a result which is in agreement with a perfectly rounded result in a maximum number of instances.

OBJECTS

It is accordingly the principal object of this invention to provide a novel adder/subtracter network for forming the n-bit sum or difference of two n-bit operands with round-off being accomplished simultaneously with the formation of the end result.

Another object of the invention is to provide a logic circuit for a conventional adder/subtracter network such that rounding is accomplished simultaneously with the formation of the end result rather than by performing a subsequent operation on the output of the conventional adder/subtracter network.

These and other objects and advantages of the invention will become apparent to those skilled in the art from a reading of the following detailed description of the accompanying drawings in which.

DESCRIPTION OF PREFERRED EMBODIMENT

Figure 1:
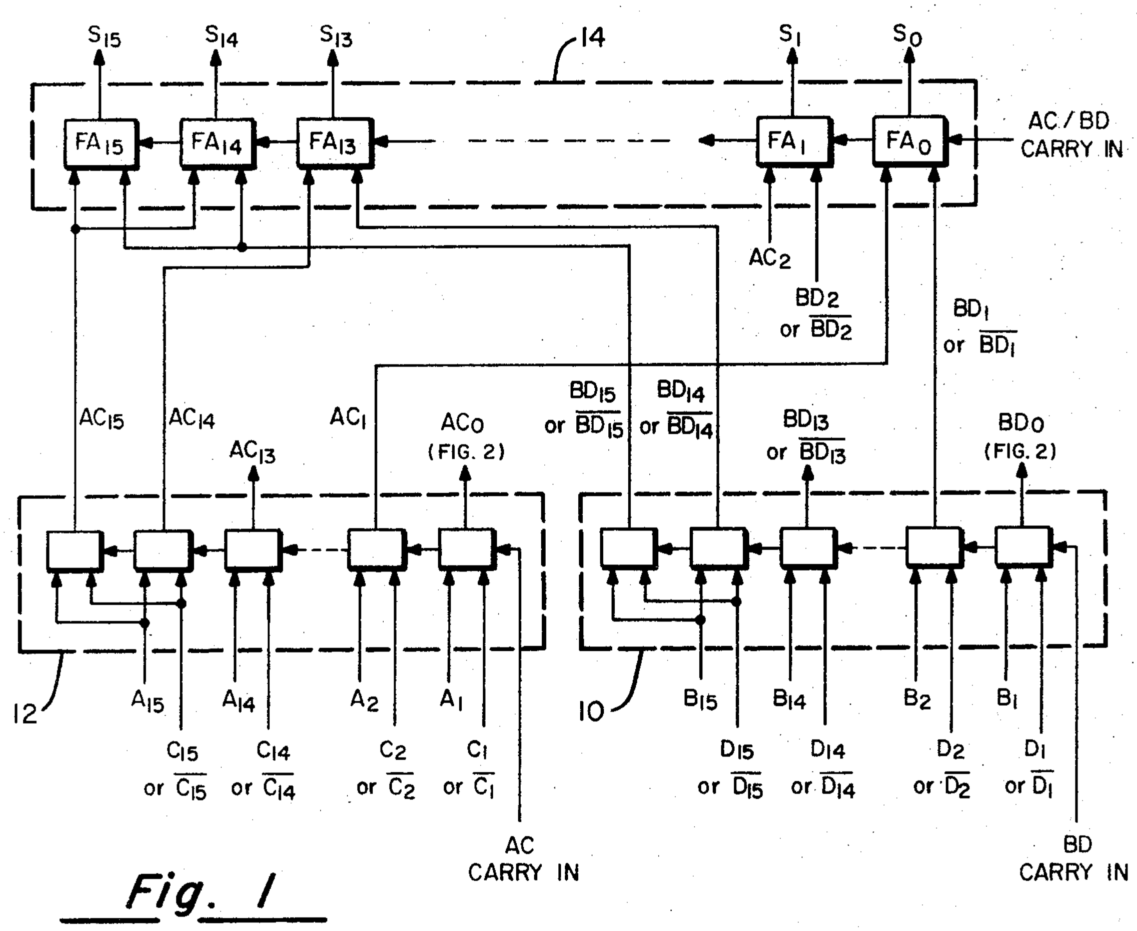
FIG. 1 illustrates by means of a block diagram a conventional adder/subtracter network.

Referring now to FIG. 1 there is illustrated by means of a block diagram an adder/subtracter network adapted to receive operands A, B, C and D as well as requisite control signals for forming the result, $R = \frac{1}{4}(A \pm B \pm C \pm D)$ where the factor ¼ is the scale factor, and the operands are binary two's complement number.

Each of the blocks pictured therein represents a full adder stage, i.e., a stage that receives as inputs corresponding bits of two n-bit binary numbers and a "carry-in" signal from a lower ordered stage and produces the sum signal as well as a carry signal for a next higher order stage. Many forms of such devices are available in the art. One such arrangement is described on pages 280–282 of the book entitled "Digital Design" by R. K. Richards, copyrighted in 1971 by John Wiley & Sons, Inc. and reference is made thereto and the references cited therein for a more complete explanation if one is felt to be necessary. Subtraction may be accomplished with this same array if the complement of the subtrahend is applied as one of the inputs and a carry signal is applied as an input to the lowest order stage.

The adder network of FIG. 1 includes three separate arrays shown enclosed by dashed line boxes 10, 12 and 14 respectively. The array 10 is shown as comprising 16 separate full adder stages adapted to receive the binary digits making up the operand B, the individual bits being identified $B_1, B_2 \ldots B_{15}$. Also applied to the individual stages of the adder array 10 are the bits comprising the operand D, namely $D_1 \ldots D_{15}$ or its complement representation $\overline{D}_1 \ldots \overline{D}_{15}$. The full adder stages are linked together such that a carry signal produced in one stage is applied as a third input to its adjacent higher order stage. The 16 bit result of summing B and D or B and $\overline{D}$ (in the case of subtraction) is formed on the output lines labeled $BD_0 \ldots BD_{15}$.

As mentioned, subtraction is accomplished by adding the minuend to the two's complement of the subtrahend. As is well known, the two's complement of a binary number may be formed by toggling (complementing) each bit of the number, adding a "1" in the lowest order stage and allowing any resulting carries to propagate. Thus, when subtracting D from B in the array 10, the complement of D, i.e., $\overline{D}$ is applied to the stages and a "1" signal is applied to the terminal labeled "BD Carry-In" associated with the lowest ordered stage.

Array 12 is constructed in an identical fashion to array 10 but, receives as its inputs the operands A and C or $\overline{C}$ to form the sum or difference $\frac{1}{2}(A + C)$ or $\frac{1}{2}(A - C)$. Again, since subtraction is accomplished by adding the two's complement of the subtrahend to the minuend, a provision is made in the lowest order stage to receive a forced carry on the input labeled "AC Carry-In."

The adder array 14, consisting of 16 separate full adder stages, serves to sum the outputs from arrays 10 and 12 to produce the desired result $\frac{1}{4}[(A \pm C \pm B \pm D)]$ on the output lines labeled $S_0 \ldots S_{15}$. Specifically, the sum outputs from stages $BD_1$ and $AC_1$ in arrays 10 and 12 respectively are added together (or subtracted) in stage $FA_0$, those from stages $BD_2$ and $AC_2$ in stage $FA_1$, etc. It is to be noted that full adder stages $FA_{14}$ and $FA_{15}$ each receive as inputs the sum or difference representing signals appearing at the outputs of stages $AC_{15}$ and $BD_{15}$ and that there is no stage in array 14 for summing the outputs from the lowest order stages of arrays 10 and 12. Also, stages 14 and 15 of adder arrays 10 and 12 have identical signals applied thereto, namely $A_{15}$, $B_{15}$ $C_{15}$, $D_{15}$ or $\overline{C}_{15}$, $\overline{D}_{15}$. By adopting this interconnection scheme, a sign-fill, end-off, one-position, right shift of the operands A, B, C and D, at each adder stage, is obtained thus forming the ¼ scale factor and preventing overflow from the highest order stage, no matter what the operands might be.

Figure 2:
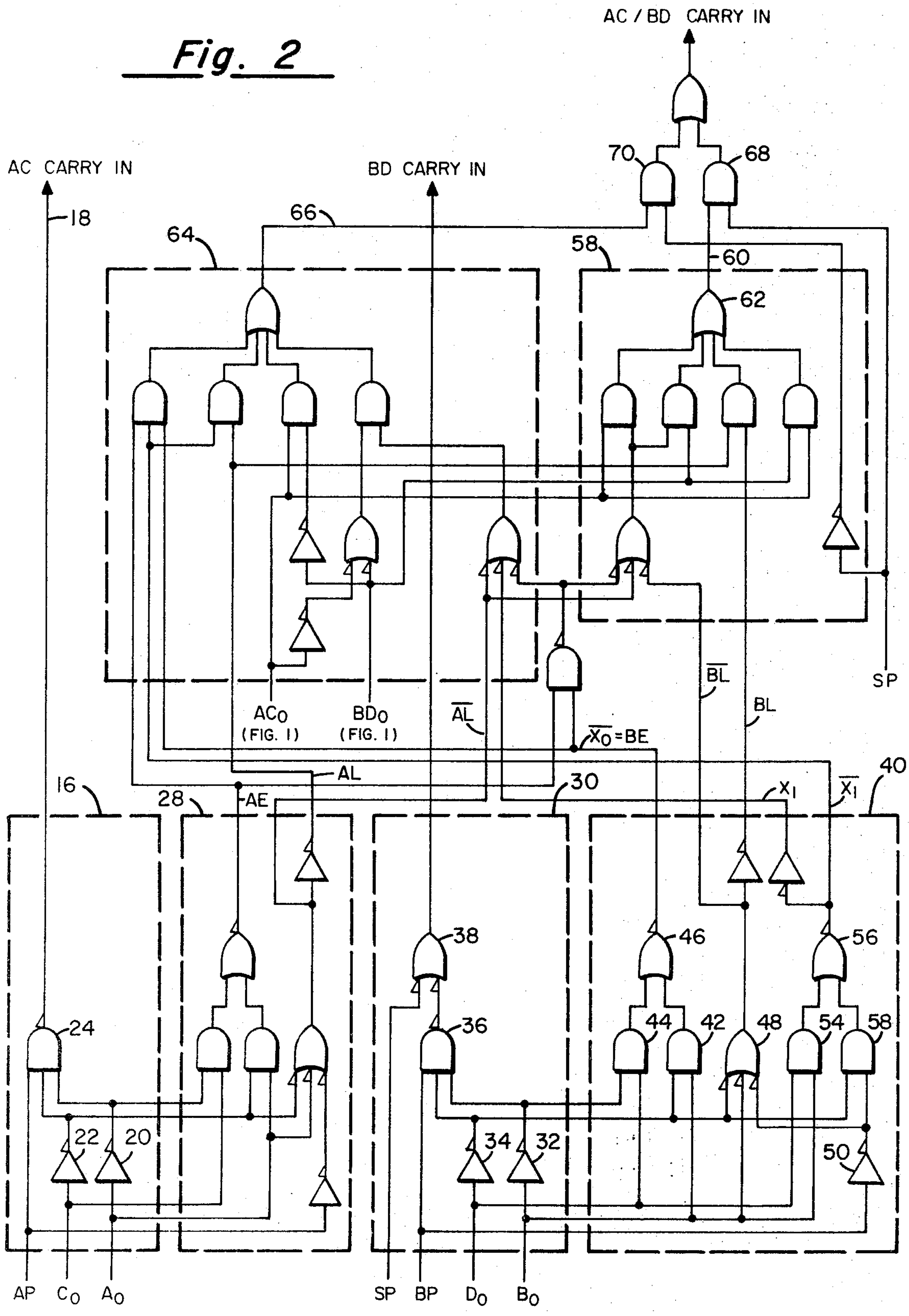
FIG. 2 illustrates by means of a logic diagram the preferred embodiment of the circuits for causing the adder/subtracter network of FIG. 1 to produce a rounded result.

The adder/subtracter network of FIG. 1 standing alone produces a result $S = \frac{1}{4}(A \pm B \pm C \pm D)$ with at least significant bits of the input operands merely truncated. As mentioned in the introductory portion of the specification, this simple truncation approach can lead to an unacceptable accumulated error when a number of arithmetic operations are performed in a sequence. FIG. 2 illustrates a logic network which when used with the adder/subtracter of FIG. 1, will cause the result to be in accordance with a perfectly rounded result in all but a very limited number of instances, no matter what the bit permutations of the operands A, B, C, and D might be. Further, the rounded result will be obtained simultaneously with the generation of the result rather than by a subsequent operation on the computed result.

While the invention will be described in connection with the simple ripple through adder/subtracter of FIG. 1, it is to be understood that it would be equally applicable to the faster operating "look-ahead" or "carry-bypass" adder arrangements, also well known in the art.

As will be described more fully hereinbelow, the logic circuit of FIG. 2 comprises a means for examining the least significant bits of the four operands A, B, C, and D as well as an indication of whether these operands are to be added or subtracted and produces control signals which when applied to the carry input terminals for the lowest order stages in adder/subtracter arrays 10, 12 and 14 in FIG. 1, cause the result appearing on the output terminals $S_0 \ldots S_{15}$ to approach a perfectly rounded result with a high degree of probability for all combinations of input operands.

In order to better understand the construction and mode of operation of the logic circuitry of FIG. 2, it is felt to be beneficial to explain the design approach used in arriving at this logic circuit. First of all it can be noted from an examination of FIG. 1 that there are a number of bits of the four binary operands A, B, C and D that are not used by the adder array 14 in forming the result bits $S_0 \ldots S_{15}$ and that therefore these bits may be used to develop the desired "Carry-In" signals for forcing the array 14 to produce a rounded result. These bits are as follows:

| | | | |
|---|---|---|---|
| $A_0$ | $C_0$ | $B_0$ | $D_0$ |
| $A_1$ | $C_1$ | $B_1$ | $D_1$ |

Also, the control bits AP, BP and SP which indicate whether the arrays 12, 10 and 14 respectively are to perform addition or subtraction are available. With these 11 possible inputs to the logic network, a total of 2,048 binary combinations are possible. The brute force approach to the design would be to form a table of all of these possible combinations and then for each entry decide on the desirable outputs for the control signals AC Carry-In, BD Carry-In and AC/BD Carry-In such that a rounded result will occur whenever possible. Then a circuit array would be designed to yield these three output control signals. This brute force approach is extremely arduous and therefore impractical.

In arriving at the optimum design depicted in FIG. 2, it was first decided to arrive at the AC Carry-In control signal by properly combining only three of the 11 possible inputs available, namely $A_0$, $C_0$ and AP. By referring to FIG. 3 which pictorially represents the relative positioning of the four operands, the partial results $(A \pm C)$ and $(B \pm D)$, and the final result S with respect to an arbitrarily located binary point, it can be seen that if the sum of bits $A_0$ and $C_0$ (denoted $AC_0$) is a binary "1" then if a rounded result is to be obtained the sum S should be higher by ½ bit from the result when no carry is forced into the lowest order stage of array 12 when adding or from the result with a forced AC Carry-In when subtracting. Therefore the conditions under which a forced AC Carry-In signal is generated may be expressed by the Boolean equation:

$$\text{AC Carry-In} = \overline{AP} + A_0 + C_0$$

Referring to FIG. 2, there is shown enclosed by dashed line box 16 the logic means responsive to the least significant bits of the operands A and C ($A_0$ and $C_0$) as well as a control signal AP which depends upon whether addition or subtraction of operands A and C is to be performed. The logic symbols used in the diagram of FIG. 2 correspond to those set forth in the Military Standard MIL—STD—806B of Feb. 26, 1962 entitled "Graphic Symbols for Logic Diagrams" and reference is made thereto for a fuller understanding of their operation or ways of implementing them with electronic circuitry.

Appearing on the output conductor 18 from the logic circuitry 16 is a control signal which when applied to the carry input terminal of the adder array 12 in FIG. 1 will force the adder to produce a rounded result whenever possible. Specifically, the input signals $A_0$ and $C_0$ are applied through inverting amplifiers 20 and 22 to first and second inputs of a NAND gate 24. The control signal AP is applied as a third input to this last mentioned gate and the output therefrom is coupled to the AC Carry-In terminal in FIG. 1. A logical "1" will be produced on this line as a forced carry when the control signal AP is a "0" (indicating subtraction) or when either of the lowest order input bits $A_0$ or $C_0$ is a "1." If the operands A and C are to be added and the lowest order bits $A_0$ and $C_0$ are both zeros, a carry signal will not be forced into the lowest order stage of the adder/subtracter array 12.

Figure 3:
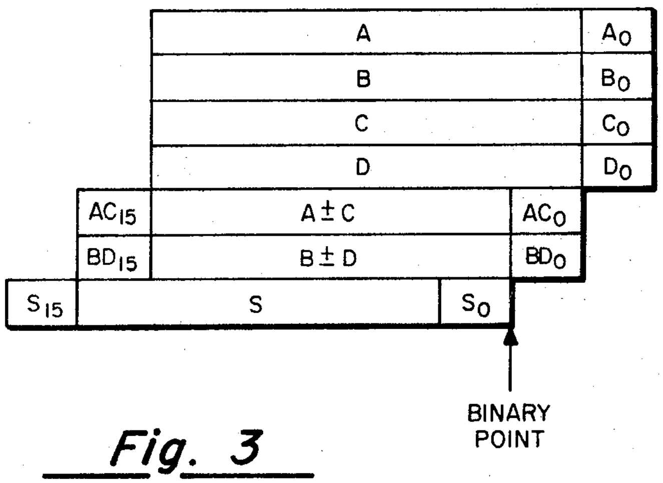
FIG. 3 illustrates the relative location of the binary point with respect to the binary digits comprising the operands to be added or subtracted in the network of FIG. 2.

In a similar fashion, reference to FIG. 3 reveals that if the sum of $B_0$ and $D_0$ formed in array 10 is a "1," the result, S, should be ½ bit higher. $A_0$, $B_0$, $C_0$, and $D_0$ potentially can contribute ¼ to the final result, S, and the partial results, $A \pm C$ and $B \pm D$, may be in error, i.e., deviate from the exact sum or difference.

As a next step in the design, the input bits $A_0$, $B_0$, $C_0$ and $D_0$ along with the control signals AP and BP are used to determine the error in the partial results from the correct values. To this end, a pair of intermediate signals AE and AL are defined such that if AE = 1, the partial result ($A \pm C$) is exact and if AL = 1, the partial result ($A \pm C$) is less than exact by ½ bit, i.e., one bit position to the right of $AC_0$ (FIG. 3). When AE and AL are both 0, the partial result ($A \pm C$) is greater than exact by ½ bit. These intermediate signals will be used in defining the conditions under which the AC/BD Carry-In signal should be produced for application to the LSB stage of array 14, but for now it is sufficient to indicate that they may be expressed by the Boolean equations:

$$AE = A_0\,C_0 + \overline{A}_0\,\overline{C}_0$$

$$AL = \overline{AP}\,A_0\,\overline{C}_0$$

The logic network for generating these two intermediate control signals is shown in FIG. 2 as enclosed by the dashed line box 28.

The manner in which the BD Carry-In control signal is developed is somewhat similar to that described above for the AC Carry-In. However, it is found that when the AC/BD adder array 14 is in the subtract mode there is a tendency for this network to produce a result which is less than the desired rounded result. To hedge against this tendency, the logic circuitry enclosed by dashed line box 30 is designed such that the BD Carry-In will always be disabled when the adder 14 is in a subtracting mode. Thus, while the partial result $B \pm D$ will tend to produce a result which is less than the desired rounded value, since it is being subtracted from the partial result $A \pm C$ the tendency is to offset the inherent tendency of the network to produce a value which is too low when the AC/BD network 14 is subtracting.

The lowest order bits of the operands B and D are applied through inverting amplifiers 32 and 34 respectively to first and second inputs of a three input NAND gate 36. The third input to this gate is the control signal BP which is a "1" when the operands B and D are to be added and which is a "0" when the operand D is to be subtracted from the operand B. The output from NAND gate 36 is connected as a first input to an AND gate 38, the other input of which is a control signal SP which indicates the mode for the AC/BD adder 14. When array 14 is to perform addition, the signal SP will be a "1" and if subtraction is to be performed, this control signal will be a "0." By examining the logic circuitry enclosed in the box 30, it can be seen that a "1" signal will be applied to the BD Carry-In terminal of array 10 when the partial results AC from array 12 and BD from array 10 are to be added in the array 14 if at the same time operands B and D are to be subtracted or either bits $B_0$ or $D_0$ are a "1." This relationship can be expressed by the Boolean equation:

$$\text{BD Carry-In} = SP\,(\overline{BP} + B_0 + D_0)$$

As before, it is helpful in arriving at the optimum logic design for the AC/BD Carry-In signal generation to develop additional intermediate control signals denoted herein as BE and BL. When SP = 1 indicating that array 14 is to add, BE is defined as a "1" whenever the partial result $B \pm D$ is exact and BL is a "1" whenever this partial result is less than exact by ½ bit. The Boolean equations for these two conditions are:

$$BE = B_0\,D_0 + \overline{B}_0\,\overline{D}_0$$

$$BL = \overline{BP}\,B_0\,\overline{D}_0$$

However, for the case where SP = 0 (array 14 in a subtract mode), the partial result, $B \pm D$, can be in error by more than ½ bit, i.e., ½ bit with respect to a binary point located to the right of $BD_0$. Specifically, in the case of subtraction, the partial result $B \pm D$ is never larger than the correct result, but it can be less than exact by 0, ½, 1 or 1½ bits. Therefore, as a next step in the design, two additional intermediate control signals $X_0$ and $X_1$ are defined such that a two bit binary number $X_1\,X_0$ (00, 01, 10, 11) indicates the number of ½ bits that the partial result $B \pm D$ is less than the correct result. By considering all of the possible binary combinations of $B_0$ and $D_0$ and the mode of operation of the array 10 (BP = 1 for addition or BP = 0 for subtraction) the Boolean equations for $X_0$ and $X_1$ can be expressed as:

$$X_0 = \overline{BE} = \overline{B_0\,D_0 + \overline{B}_0\,\overline{D}_0}$$

$$X_1 = B_0\,D_0 + \overline{D}_0\,\overline{BP}$$

The logic for developing the intermediate control signals $X_0$, $X_1$, BE and BL is shown in FIG. 2 as being enclosed by the dashed line box 40. Gates 42, 44 and 46 combine the direct inputs $B_0$, $D_0$ and the inverted versions $\overline{B}_0$, $\overline{D}_0$ to generate the signal $\overline{BE}$ which also conveniently turns out to be equal to $\overline{X}_0$. Gate 48 combines operand bits $B_0$, $D_0$ and the control signal $\overline{BP}$ to yield the intermediate control signal BL and inverters 50 and 34 along with gates 54, 56 and 58 combine the BP signal with the operand bits $B_0$ and $D_0$ to generate the intermediate control signal $\overline{X}_1$ and its complement. For convenience, the intermediate control signals are indicated on the output lines by which they are transmitted to the AC/BD Carry-In logic.

The AC/BD Carry-In logic can be determined by using this control signal to force a rounded result from the array 14 when possible. It is to be noted that the ability to round with the AC/BD Carry-In signal may be limited or constrained because of the selections previously made for determining the AC Carry-Input and the BD Carry-Input.

Considering first the conditions for rounding when array 14 is in an add mode, i.e., SP = 1, there are available as inputs the intermediate result bits $AC_0$, $BD_0$ and the intermediate control signals AL, AE, BL and BE. The contribution to the final result, S, where the binary point is to the right of the sum bit, $S_0$, (FIG. 3) is ¼ bit for $A_L$ and $B_L$ and ½ bit for $AC_0$ and $BD_0$. If it is assumed that the intermediate results $A \pm C$ and $B \pm D$ are added in array 14 with no forced carry into the lowest order stage, the result will be short or less than correct result by the number represented by the following sum ($\epsilon$):

$$\epsilon = \epsilon_0 \cdot \begin{array}{ll} & -AG \\ & -BG \\ AC_0 & +AL \\ BD_0 & +BL \\ \hline \epsilon-1 & \epsilon-2 \end{array}$$

where $AG = \overline{AL} \cdot \overline{AE}$ and $BG = \overline{BL} \cdot \overline{BE}$. If in examining this sum it is found that $\epsilon \geq 0.10$, then a AC/BD Carry-In signal is to be generated.

Referring to FIG. 2, the logic circuitry enclosed by dashed line box 58 is an implementation of a means for determining whether the sum, $\epsilon$, is greater than or equal to 0.10. Specifically a "1" output on line 60 from OR gate 62 will be generated whenever the factor, $\epsilon$, equals or exceeds 0.10.

Finally, the case where the array 14 of FIG. 1 is in a subtract mode (SP = 0) will be considered such that the result AC − BD will be formed therein. As before, in designing the necessary logic circuitry, it is convenient to consider the manner in which the actual result will deviate from a perfectly rounded result if no AC/BD Carry-In signal is applied to the array. In doing so, a sum, $\epsilon$, is again formed to determine by how much the actual result will be less than the desired one.

| | | |
|---|---|---|
| | $\underline{AC_0}$ | $-A_G$ |
| | $\overline{BD}_0$ | $+A_L$ |
| | $-X_1$ | $-X_0$ |
| | $-1$ | |
| $\epsilon = \epsilon_0$ | $\epsilon_{-1}$ | $\epsilon_{-2}$ |

Again, the terms $AC_0$ and $\overline{BD}_0$ each contribute a ½ bit to the deviation while AL contributes ¼ bit and AG contributes −¼ bit, hence, their assignment to the indicated bit columns in the above expression. The integer 1, is attributed to the two's complementing of the partial result B ± D when B ± D is to be subtracted from the partial result A ± C through an addition process. The number, $X_1 X_0$, is a two bit binary number which indicates the degree to which the partial result B ± D is less than the exact result when array 14 is operating in a subtraction mode and since B ± D is being subtracted in array 14, the number $X_1 X_0$ must be subtracted in forming the above sum, $\epsilon$. Where $\epsilon$ equals or exceeds 0.10 (binary) then a "1" is to be forced into the AC/BD carry input of the lowest order stage of adder/subtracter array 14 (FIG. 1) in order to achieve rounding.

The logic circuitry enclosed by dashed line box 64 is the apparatus utilized when array 14 is in a subtraction mode for producing a signal on line 66 when the sum $\epsilon$ equals or exceeds 0.10.

By examining gates 68 and 70, it can be seen that an AC/BD Carry-In signal will be applied to array 14 whenever SP = 1 (indicating addition) and a "1" signal is present at the output of gate 62 or when SP = 0 (indicating subtraction) and a "1" signal is present on line 66. The Boolean equations for these two conditions can be expressed as follows: For SP = 1

$$\text{AC/BD Carry-In} = AC_0 \cdot BD_0 + AL \cdot BL + (BD_0 + AC_0)(AE \cdot BE + BL + AL)$$

for SP = 0

$$\text{AC/BD Carry-In} = \overline{X}_1 \cdot \overline{X}_0 \cdot AE + \overline{X}_1 \cdot AL + \overline{BD}_0 \cdot AC_0 + (\overline{BD}_0 + AC_0)(AE \cdot \overline{X}_0 + \overline{X}_1 + AL)$$

While it is believed unnecessary for a complete understanding of the construction and mode of operation of the present invention, it can be shown that the design depicted in FIG. 2 will cause the adder/subtracter network of FIG. 1 to produce a perfectly rounded result with a probability of 98.24 percent. By adding additional circuitry this probability can be improved still further. For example, if the $AC_1$ bit input into stage 14 were forced to a "1" regardless of its actual state whenever the illustrated circuitry cannot produce a perfectly rounded result from array 14, the probability of producing a perfectly rounded result would be increased to 99.12 percent.

It is to be understood that the form of the invention described herein is only one possible embodiment. Various changes such as the substitution of equivalent logic elements, may be made without departing from the spirit and scope of the invention as defined by the following claims.

What is claimed is:

1. An add/subtract circuit for a digital computer comprising:

a. *n* full-adder stages each having first and second operand input terminals, a carry input terminal, a sum output terminal and a carry output terminal;
b. means connecting said full-adder stages in tandem with the carry output terminal of a lower order stage connected to the carry input terminal of its adjacent higher order stage;
c. means for applying corresponding bits of two n-bit operands individually to the first and second operand input terminals of said n full-adder stages;
d. logic means responsive to the bit permutations of the least significant bits of the operands and to a signal determinative of the arithmetic operation being performed, for producing a control signal; and
e. means for applying said control signal to the carry input terminal of the lowest order full-adder stage such that the result of said arithmetic operation developed at said sum output terminals approaches a perfectly rounded result.

2. An add/subtract circuit in which rounding is accomplished simultaneously with the formation of the result, comprising:

a. *n* full-adder stages each having first and second operand input terminals, a carry input terminal, a sum output terminal and a carry output terminal;
b. means connecting said full-adder stages in tandem with the carry output terminal of a lower order stage connected to the carry input terminal of its adjacent higher order stage;
c. means for applying corresponding bits of two *n*-bit operands A and B individually to the first and second operand input terminals of said *n* full-adder stages;
d. logic means responsive to the permutations of the least significant bits of the operands ($A_0$ and $B_0$) and to a signal determinative of the arithmetic operation being performed (addition or subtraction) for producing a Carry-In control signal in accordance with the Boolean equation Carry-In = $A_0 + B_0$ + Subtract; and
e. means for applying said Carry-In control signal to the carry input terminal of the lowest order full-adder stage.

3. An add/subtract network in which rounding is accomplished simultaneously with the formation of the result, comprising:

a. a plurality of groups of n full-adder stages, each stage having first and second operand input terminals, a carry input terminal, a sum output terminal and a carry output terminal;

b. means connecting the n full-adder stages of each of said individual groups in tandem with the carry output terminal of a lower order stage in a group connected to the carry input terminal of its adjacent higher order stage in that group;

c. means for applying corresponding ordered bits of two n bit operands to the operand input terminals of corresponding stages in said plurality of groups of n full-adder stages;

d. logic means responsive to the bit permutations of predetermined bit positions of the operands and to signals determinative of the arithmetic operation being performed by said plurality of groups for producing plural control signals; and e. means for applying said plural control signals individually to the carry input terminal of each of the lowest order full-adder stages of said plurality of groups such that the result of said arithmetic operation developed at said sum output terminals of one of said plurality of groups approaches a perfectly rounded result.

4. Apparatus as in claim 3 wherein said logic means includes circuits for generating first and second control signals in accordance with the Boolean equations:

$$\text{AC Carry-In} = \overline{AP} + A_0 + C_0$$

and $$\text{BD Carry-In} = SP\,(\overline{BP} + B_0 + D_0),$$

where $A_0$, $B_0$, $C_0$ and $D_0$ are the least significant bits of the operands to be combined and AP, BP and SP are control signals determining whether a particular group of said plurality is to add or subtract the operands applied to its operand input terminals.

5. Apparatus as in claim 4 and further including:

circuitry in said logic means for generating an additional control signal AC/BD Carry-In in accordance with the Boolean equation:

$$\text{AC/BD Carry-In} = AC_0 \cdot BD_0 + \overline{AP}\,A_0\,\overline{C}_0\,\overline{BP}\,B_0\,D_0 + [BD_0 + AC_0]\,[(A_0\,C_0 + \overline{A}_0\,\overline{C}_0)\,(B_0\,D_0 + \overline{B}_0\,\overline{D}_0) + \overline{BP}\,B_0\,\overline{D}_0 + \overline{AP}\,A_0\,\overline{C}_0]$$

where $AC_0$ and $BD_0$ represent the sum of the lowest order bits of the operands A and C or B and D, respectively.

6. Apparatus as in claim 5 wherein said means for applying said plural control signals comprises means connecting said first and second control signals to the carry input terminal of the lowest order stages in first and second of said plurality of groups, and said additional control signal to the carry input terminal of the lowest order stage of a third of said plurality of groups when said third group is to add the operand combinations applied as inputs to the operand input terminals.

7. Apparatus as in claim 4 and further including:

circuitry in said logic means for generating an additional control signal AC/BD Carry-In in accordance with the Boolean equation:

$$\text{AC/BD Carry-In} = [(\overline{B}_0 + \overline{D}_0)\,(BP + D_0)]\,[B_0\,D_0 + \overline{B}_0\,\overline{D}_0]\,[A_0\,C_0 + \overline{A}_0\,\overline{C}_0] + [(\overline{B}_0 + \overline{D}_0)\,(BP + D_0)]\,[\overline{AP}\,A_0\,\overline{C}_0] + \overline{BD}_0 \cdot AC_0 + [\overline{BD}_0 + AC_0]\,[(A_0\,C_0 + \overline{A}_0\,\overline{C}_0)\,(B_0\,D_0 + \overline{B}_0\,\overline{D}_0) + (B_0\,\overline{D}_0)\,(BP + D_0) + \overline{AP}\,A_0\,\overline{C}_0]$$

where $AC_0$ and $BD_0$ represent the sum of the lowest order bits of the operands A and C or B and D, respectively.

8. Apparatus as in claim 7 wherein said means for applying said plural control signals comprises means connecting said first and second control signals to the carry input terminal of the lowest order stages in first and second of said plurality of groups and said additional control signal to the carry input terminal of the lowest order stage of a third of said plurality of groups when said third group is to subtract the operand combinations applied as inputs to the operand input terminals.

* * * * *